(12) United States Patent
Norioka et al.

(10) Patent No.: US 12,194,442 B2
(45) Date of Patent: Jan. 14, 2025

(54) GAS DESULFURIZING AGENT AND DESULFURIZING METHOD

(71) Applicant: Osaka Gas Co., Ltd., Osaka (JP)

(72) Inventors: Shimpei Norioka, Osaka (JP);
Hirofumi Ohtsuka, Osaka (JP);
Takenori Hirano, Izumi (JP)

(73) Assignee: Osaka Gas Co., Ltd., Osaka (JP)

( * ) Notice: Subject to any disclaimer, the term of this patent is extended or adjusted under 35 U.S.C. 154(b) by 708 days.

(21) Appl. No.: 17/424,007

(22) PCT Filed: Jan. 16, 2020

(86) PCT No.: PCT/JP2020/001285
§ 371 (c)(1),
(2) Date: Jul. 19, 2021

(87) PCT Pub. No.: WO2020/153225
PCT Pub. Date: Jul. 30, 2020

(65) Prior Publication Data
US 2022/0080398 A1 Mar. 17, 2022

(30) Foreign Application Priority Data
Jan. 23, 2019 (JP) .................. 2019-009610

(51) Int. Cl.
*B01J 23/88* (2006.01)
*B01J 20/02* (2006.01)
(Continued)

(52) U.S. Cl.
CPC ........... *B01J 23/8896* (2013.01); *B01J 20/08* (2013.01); *C10L 3/103* (2013.01); *C10L 2290/141* (2013.01); *C10L 2290/542* (2013.01)

(58) Field of Classification Search
None
See application file for complete search history.

(56) References Cited

U.S. PATENT DOCUMENTS

| 4,985,074 A | 1/1991 | Okada et al. |
| 7,005,059 B1 | 2/2006 | Quartararo et al. |
| (Continued) | | |

FOREIGN PATENT DOCUMENTS

| EP | 3632538 A1 | 4/2020 |
| JP | 1123627 A | 5/1989 |
| (Continued) | | |

OTHER PUBLICATIONS

Escalona et al., Promotion of Re/AIO and Re/C catalysts by Ni sulfide in the HDS and HDN of gas oil: Effects of Ni loading and support, Applied Catalysis A: General, 2007, pp. 218-229, 319.

(Continued)

*Primary Examiner* — Daniel Berns
(74) *Attorney, Agent, or Firm* — The Webb Law Firm

(57) ABSTRACT

Provided are high-performance gas desulfurizing agent and desulfurizing method each of which has a high desulfurizing ability even at low temperatures and keeps its desulfurizing performance for an extended period of time. The gas desulfurizing agent includes zinc oxide, aluminum oxide, and copper, the desulfurizing agent further including nickel in an amount of 1.0% by mass to 10% by mass and rhenium in an amount of 0.1% by mass to 1.0% by mass. The gas desulfurizing method includes bringing the desulfurizing agent into contact with gas in coexistence of hydrogen to decompose a sulfur compound in the gas and remove the sulfur compound from the gas.

2 Claims, 1 Drawing Sheet

(51) Int. Cl.
*B01J 20/06* (2006.01)
*B01J 20/08* (2006.01)
*B01J 23/889* (2006.01)
*C10L 3/10* (2006.01)

(56) References Cited

U.S. PATENT DOCUMENTS

2009/0071876 A1 3/2009 Masuda et al.
2020/0108371 A1 4/2020 Norioka et al.

FOREIGN PATENT DOCUMENTS

| JP | 1123628 A | 5/1989 |
| JP | 7163884 A | 6/1995 |
| JP | 1161154 A | 3/1999 |
| JP | 11335101 A | 12/1999 |
| JP | 2001506914 A | 5/2001 |
| JP | 2001286753 A | 10/2001 |
| JP | 2007254728 A | 10/2007 |
| WO | 2007021084 A1 | 2/2007 |
| WO | 2018216555 A1 | 11/2018 |

OTHER PUBLICATIONS

Matsuhisa, Catalyst, 2006, pp. 326-332, vol. 48, No. 5.
Pecoraro et al., Hydrodesulturization Catalysis by Transition Metal Sulfides, Journal of Catalysis, 1981, pp. 430-445, 67.
Satokawa et al., Adsorptive removal, of dimethylsulfide and t-butylmercaptan from pipeline natural gas fuel on Ag zeolites under ambient conditions, Applied Catalysis B: Environmental, 2005, pp. 51-56, 56.
Shiba, Catalyst, 1959, pp. 49-57, vol. 1, No. 1.

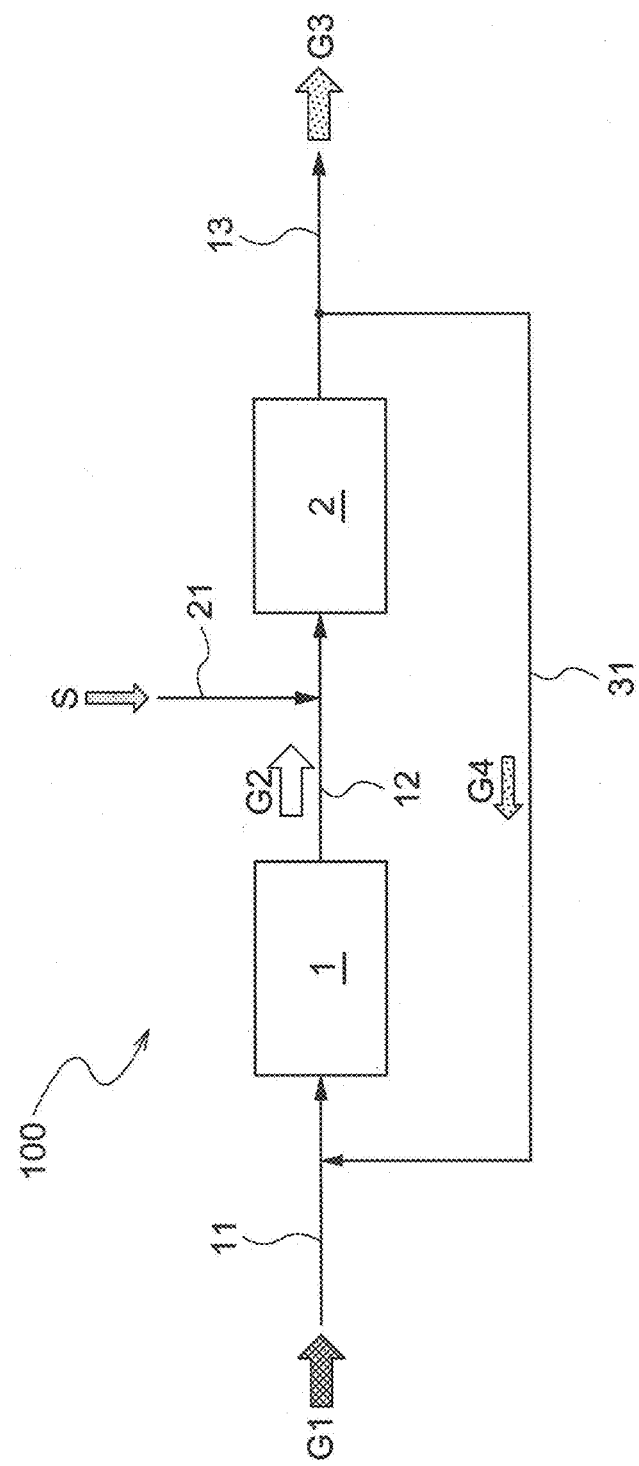

GAS DESULFURIZING AGENT AND DESULFURIZING METHOD

CROSS-REFERENCE TO RELATED APPLICATIONS

This application is the United States national phase of International Application No. PCT/JP2020/001285 filed Jan. 16, 2020, and claims priority to Japanese Patent Application No. 2019-009610 filed Jan. 23, 2019, the disclosures of which are hereby incorporated by reference in their entirety.

BACKGROUND OF THE INVENTION

Field of the Invention

The present invention relates to a gas desulfurizing agent and desulfurizing method.

Description of Related Art

The steam reforming process is a process of causing a hydrocarbon to react with steam to produce gas whose main component is hydrogen. The process is performed to, for example, produce industrial hydrogen or reform fuel for a fuel cell.

The steam reforming process particularly suitably involves using, as a raw material, a raw fuel whose main component is a light hydrocarbon such as natural gas, liquefied petroleum gas (LPG), or town gas made of either of the above. This is because such a raw fuel contains almost no heavy hydrocarbon, which likely causes carbon to be deposited, and has only a small sulfur content. Even natural gas or liquefied petroleum gas (LPG), however, normally contains a sulfur compound in a trace amount. Further, even town gas whose main raw material is liquefied natural gas (LNG), which has substantially no sulfur content, does contain a trace amount of odorant added thereto to ensure safety during transport.

Commonly used odorants are organosulfur compounds such as tertiary-butylmercaptan (TBM), tetrahydrothiophene (THT), and dimethyl sulfide (DMS).

The steam reforming reaction involves use of a catalyst including, for example, Ni and/or Ru supported by a heat-resistant inorganic oxide. Such a catalyst is known to become poisoned by the sulfur content and rapidly lose its activity. Raw materials subjected to the steam reforming reaction thus need to be desulfurized to reduce the sulfur content as much as possible.

Typical, known desulfurizing methods performed before steam-reforming a hydrocarbon include hydrodesulfurization (hydrogenated desulfurization), adsorptive desulfurization, and ultra-high-level desulfurization.

Hydrodesulfurization is a method that includes causing an organosulfur compound in a hydrocarbon raw material to react with hydrogen with use of a Co—Mo-based or Ni—Mo-based catalyst for hydrogenolysis and then causing hydrogen sulfide produced to be adsorbed on zinc oxide for removal (Non-patent Literatures 1 and 2). Hydrodesulfurization is widely in practical use: it is used, for example, as a process of desulfurizing fuel oil for petroleum refining. The adsorption of hydrogen sulfide on zinc oxide may, however, reach equilibrium and in such a case, inevitably leaves a trace amount of sulfur. Further, sulfur is reported to become leaked to a steam-reforming catalyst in an amount of several tens of parts per billion (Non-patent Literature 2).

Adsorptive desulfurization involves adsorbing and removing a sulfur compound at a normal temperature with use of a zeolite containing a transition metal such as Ag or Cu (Patent Literature 1 and Non-patent Literature 3).

Adsorptive desulfurization is advantageous in that it can be performed at a normal temperature. It is also advantageous in that it requires no hydrogen addition. Adsorptive desulfurization is, however, disadvantageous in that it allows for only a small desulfurizing ability per volume. It is also disadvantageous in that it suffers from decreased adsorbing performance if the gas contains water. It is further disadvantageous, for example, in that Ag, which is relatively resistant to water, is particularly expensive.

Ultra-high-level desulfurization involves bringing a hydrocarbon raw material into contact with a copper-zinc-based desulfurizing agent in the coexistence of hydrogen at temperatures ranging from approximately 100° C. to 400° C. for removal of the sulfur content in the raw material (Patent Literatures 2 and 3).

This method allows the sulfur content to be reduced to a concentration of 1 ppb or lower after the treatment. This can prevent poisoning of the steam-reforming catalyst over a long time period. Ultra-high-level desulfurization is, however, disadvantageous in that it requires a large amount of desulfurizing agent to achieve sufficient desulfurizing performance at a temperature of 300° C. or lower similarly to hydrodesulfurization.

Patent Literature 4, in view of the above points, discloses a desulfurizing agent produced by mixing a mixed aqueous solution of a copper compound and a zinc compound with an aqueous alkaline substance solution to produce a precipitate, firing the precipitate produced, preparing a copper oxide-zinc oxide mixture molded product with use of a slurry of the fired product, impregnating the molded product with iron or nickel, further firing the resulting product, and reducing the resulting oxidized fired product with hydrogen.

Patent Literature 5 discloses a gas desulfurizing agent that contains zinc oxide, aluminum oxide, and copper and that further contains nickel in an amount of 1.0% by mass to 10% by mass and ruthenium in an amount of 0.1% by mass to 1.0% by mass.

These desulfurizing agents achieve high desulfurizing performance even at low temperatures. However, a desulfurizing agent with even higher performance is demanded greatly for a case in which, for example, the mount space and replacement are restricted, such as a fuel cell.

Non-patent Literature 4 reports the result of comparing the respective activities of different elements at 400° C. to the reaction of hydrodesulfurization of dibenzothiophene (DBT), which is said to be relatively difficult to desulfurize. The patent literature discloses the respective activities of the fourth-period (from Ti to Ni), fifth-period (from Zr to Pd), and sixth-period (from Ta to Au) transition metals, and points out the respective high activities of Ru (379.5), Ir (171.8), and Rh (106.1). The patent literature also discloses the respective activities of, for example, Re (39.4), Mo (8.0), Cr (4.8), W (3.2), Nb (1.7), Ni (1.5), Ti (1.4), and Co (1.4), other than the platinum group. (The numbers in parentheses are each a number calculated by dividing the number of DBT molecules reacted per mole of the metal and per second by $10^{16}$, and indicate the relative activity per atom.)

Patent Literature 6 discloses a hydrocarbon desulfurizing agent containing nickel in an amount of 50% by mass to 95% by mass in terms of the oxide (NiO), molybdenum in an amount of 0.5% by mass to 25% by mass in terms of the oxide ($MoO_3$), ruthenium in an amount of 0.1% by mass to 12% by mass in terms of the oxide ($RuO_2$), and an inorganic oxide. The patent literature discloses the desulfurizing agent as being capable of particularly efficiently remove the sulfur content in a hydrocarbon in, for example, kerosene, jet fuel, naphtha, gasoline, LPG, or natural gas and thereby remarkably increasing the 50-mass-ppb breakthrough time.

This patent literature does not disclose adding hydrogen for the desulfurizing treatment, and thus does not disclose the reaction mechanism in detail. The reaction mechanism is, however, presumed to not involve hydrodesulfurization reaction. It is unknown whether the desulfurizing agent is capable of keeping its desulfurizing performance for an extended period of time without causing carbon to be deposited. Further, while the patent literature discloses the desulfurizing performance with respect to kerosene as fuel oil, it fails to disclose the desulfurizing performance with respect to raw fuel gas. It is unclear whether the desulfurizing agent is, if the raw material is in gaseous form, capable of removing the sulfur content in the gas.

Many example desulfurizing agents contain Ni. If, however, a desulfurizing agent contains Ni in an amount of as much as 50% by mass to 95% by mass, it may cause more carbon to be deposited. Ni has high activity of decomposing hydrocarbon. If a raw fuel gas contains a C5 or more hydrocarbon or olefin, a desulfurizing agent may, depending on the operating conditions, start causing carbon to be deposited and lose its desulfurizing function after a relatively short time period.

PATENT LITERATURE

Patent Literature 1
Japanese Unexamined Patent Application Publication, Tokukai, No. 2001-286753
Patent Literature 2
Japanese Unexamined Patent Application Publication, Tokukaihei, No. H1-123627
Patent Literature 3
Japanese Unexamined Patent Application Publication, Tokukaihei, No. H1-123628
Patent Literature 4
Japanese Unexamined Patent Application Publication, Tokukaihei, No. H11-61154
Patent Literature 5
International Publication No. 2018/216555
Patent Literature 6
Japanese Unexamined Patent Application Publication, Tokukai, No. 2007-254728

Non-Patent Literature

Non-Patent Literature 1
Shiba, Catalysts and Catalysis, Vol. 1, No. 1, page 49 (1959)
Non-patent Literature 2
Matsuhisa, Catalysts and Catalysis, Vol. 48, No. 5, page 326 (2006)
Non-patent Literature 3
S. Satokawa, Y. Kobayashi, H. Fujiki, Applied Catalysis B: Environmental, Vol. 56, page 51 (2005)
Non-patent Literature 4
T. A. Pecoraro, R. R. Chianelli, Journal of Catalysis, Vol. 67, page 430 (1981)

SUMMARY OF THE INVENTION

The above circumstances have led to a demand for a high-performance gas desulfurizing agent and desulfurizing method each of which is available for a case in which the mount space and replacement are restricted, such as a fuel cell, has a high desulfurizing ability even at low temperatures, and keeps its desulfurizing performance for an extended period of time.

The present invention has been accomplished in view of the above circumstances. It is an object of the present invention to provide a high-performance gas desulfurizing agent and a desulfurizing method involving use of the desulfurizing agent which desulfurizing agent, even at low temperatures, achieves high desulfurizing performance and thereby allows the concentration of a sulfur compound slipping to a later stage to be kept at a particularly low level for an extended time period, and also has a high desulfurization capacity and thereby treats gas for an extended period of time with a small amount of the desulfurizing agent.

In order to attain the above object, a gas desulfurizing agent according to the present invention characteristically includes:

zinc oxide; aluminum oxide; and copper, the gas desulfurizing agent further including: nickel in an amount of 1.0% by mass to 10% by mass; and rhenium in an amount of 0.1% by mass to 1.0% by mass.

With the above arrangement, the desulfurizing agent contains a mixture of zinc oxide, aluminum oxide, and copper as well as nickel and rhenium as its components. The term "mixture" as used herein can indicate not only the state of mixed components but also such a state as a complex oxide.

With the above arrangement, the desulfurizing agent, even at relatively low temperatures, achieves high desulfurizing performance with respect to gas (such as raw fuel gas). Thus, using the above desulfurizing agent as a desulfurizing agent for a desulfurizer or the like allows the concentration of a sulfur compound slipping (that is, leaking) to a later stage of the desulfurizer (that is, the downstream side thereof) to be kept at a particularly low level for an extended time period.

The desulfurizing agent arranged as above has a large desulfurization capacity. The desulfurizing agent is thus effective with only a small amount used and capable of decomposing a sulfur compound in gas and removing it from the gas for an extended period of time.

The desulfurizing agent arranged as above includes copper in the metallic state or copper oxide as the above copper, preferably metal copper as main copper.

The desulfurizing agent arranged as above includes nickel in the metallic state or its oxide as the above nickel, preferably nickel in the metallic state (metal nickel) as main nickel.

The desulfurizing agent arranged as above includes rhenium in the metallic state or its oxide as the above rhenium, preferably metal rhenium as main rhenium.

In order to attain the above object, a gas desulfurizing method according to the present invention characteristically includes:

bringing a desulfurizing agent into contact with gas in coexistence of hydrogen to decompose a sulfur compound in the gas and remove the sulfur compound from the gas, the desulfurizing agent including: zinc oxide, aluminum oxide, and copper, the desulfurizing agent further including: nickel in an amount of 1.0% by mass to 10% by mass; and rhenium in an amount of 0.1% by mass to 1.0% by mass.

With the above arrangement, the desulfurizing agent, even at relatively low temperatures, achieves high desulfurizing performance with respect to gas (such as raw fuel gas). Thus, the desulfurizing method allows the concentration of a sulfur compound slipping to a later stage to be kept at a particularly low level for an extended time period.

Further, with the above arrangement, the desulfurizing method can utilize the large desulfurization capacity of the desulfurizing agent to decompose a sulfur compound in gas and removing it from the gas for an extended period of time with use of only a small amount of the desulfurizing agent.

The desulfurizing agent is better treated in the coexistence of hydrogen in advance for reduction of its copper, rhenium, and nickel components. This is preferable because subjecting the desulfurizing agent to the reduction before bringing it into contact with gas allows the desulfurizing agent to have a high ability to decompose and remove a sulfur compound.

BRIEF DESCRIPTION OF THE DRAWINGS

FIG. 1 is a diagram illustrating a flow for a desulfurizing system that allows a desulfurizing method involving use of a desulfurizing agent to be performed.

DETAILED DESCRIPTION OF PREFERRED EMBODIMENTS

Embodiments

The description below deals with a gas desulfurizing agent and desulfurizing method as an embodiment of the present invention.

The desulfurizing agent of the present invention characteristically includes zinc oxide, aluminum oxide, and copper, and further includes nickel in an amount of 1% by mass to 10% by mass and rhenium in an amount of 0.1% by mass to 1.0% by mass.

The desulfurizing agent of the present invention is normally produced through a process of firing its ingredients in the air as detailed below.

The desulfurizing agent is subjected to a reduction treatment before use for desulfurization reaction.

The zinc and the aluminum are each presumed to be in the oxidized state ($ZnO$, $Al_2O_3$) immediately after production of the desulfurizing agent as well as after the reduction treatment.

The copper and the nickel are each presumed to be mainly in the form of an oxide ($Cu_2O$, $NiO$) after the firing in the air (that is, immediately after the production) and mainly in the metallic state after the reduction treatment.

The rhenium is mainly in the form of oxides ($ReO_2$, $Re_2O_7$) after the firing in the air (that is, immediately after the production) and mainly metal Re after the reduction treatment. The rhenium may also be partially in the form of an oxide with a low oxidation number ($ReO_2$).

The desulfurizing agent of the present invention thus includes zinc oxide, aluminum oxide, and copper oxide immediately after its production.

The desulfurizing agent of the present invention may include zinc oxide, aluminum oxide, and copper (metal copper) as well as copper oxide at the time of its use.

The desulfurizing agent of the present invention includes nickel in an amount of 1.0% by mass to 10% by mass, based on the metallic state of the nickel, relative to the entire mass of the desulfurizing agent. The desulfurizing agent includes rhenium in an amount of 0.1% by mass to 1.0% by mass, based on the metallic state of the rhenium, relative to the entire mass of the desulfurizing agent.

The desulfurizing agent of the present invention includes an oxide of nickel as a nickel component and an oxide of rhenium as a rhenium component immediately after its production.

The desulfurizing agent of the present invention includes metal nickel as a nickel component and metal rhenium as a rhenium component at the time of its use. The desulfurizing agent may further include an oxide of nickel and/or an oxide of rhenium at the time of its use, similarly to the copper above.

The desulfurizing agent of the present invention is first subjected to a reduction treatment in the presence of hydrogen, and is then brought into contact with gas in the coexistence of hydrogen. This operation decomposes a sulfur compound in the gas and removes it from the gas.

[Description of Method for Producing Desulfurizing Agent]

The desulfurizing agent of the present invention may be produced by any method, but is preferably produced by a method similar to that disclosed in Patent Literature 4.

The desulfurizing agent of the present invention may be produced by the following method: First, an aqueous copper compound such as copper nitrate ($Cu(NO_3)_2$) and an aqueous zinc compound such as zinc nitrate ($Zn(NO_3)_2$) are mixed with an aqueous alkaline substance solution in the coexistence of an aluminum compound. The aluminum compound may be dissolved or gelated.

The mixing operation causes a precipitate.

Then, the precipitate is fired, so that a mixture of copper oxide, zinc oxide, and aluminum oxide is produced. The description below refers to this mixture as "copper oxide-zinc oxide-aluminum oxide mixture".

Next, the mixture is molded into a copper oxide-zinc oxide-aluminum oxide mixture molded product. The copper oxide-zinc oxide-aluminum oxide mixture molded product is impregnated with an aqueous solution containing nickel and rhenium, and is then fired. This produces the desulfurizing agent of the present invention, in which nickel and rhenium are supported by the copper oxide-zinc oxide-aluminum oxide mixture molded product as a support.

The above molding may involve, for example, compression (compression molding). An example of the compression molding is tablet making.

The copper oxide-zinc oxide-aluminum oxide mixture molded product may be replaced with a commercially available counterpart, for example, a copper oxide-zinc oxide-aluminum oxide mixture molded product commercially available as a desulfurizing agent, a methanol synthesis catalyst, or a carbon monoxide conversion catalyst.

In the case where a commercially available copper oxide-zinc oxide-aluminum oxide mixture molded product is used as a support, it is also impregnated with an aqueous solution containing nickel and rhenium, and is then fired for production of the desulfurizing agent of the present invention.

A commercially available copper oxide-zinc oxide-aluminum oxide mixture molded product may contain a molding assistant such as graphite. Such a molding assistant will not impair the function of the resulting desulfurizing agent unless the molding assistant is present in an extremely large amount.

The aqueous solution containing nickel and rhenium may be prepared with use of an aqueous nickel compound as a raw material for the nickel. Examples of the aqueous nickel compound include nickel nitrate, nickel acetate, and nickel chloride.

Among the above raw materials for the nickel, nickel nitrate and nickel acetate are particularly suitable. This is because they are preferably highly dissolvable, and do not leave chlorine ions in the desulfurizing agent to be prepared, thereby preventing remaining chlorine ions from impairing the desulfurizing performance.

The aqueous solution containing nickel and rhenium may be prepared with use of, for example, ammonium perrhenate ($NH_4ReO_4$), rhenium (III) chloride, or rhenium (V) chloride as a raw material for the rhenium.

Among the above raw materials for the rhenium, ammonium perrhenate is particularly suitable. This is because it does not leave chlorine ions in the desulfurizing agent to be prepared, thereby preventing remaining chlorine ions from impairing the desulfurizing performance.

The desulfurizing agent contains copper in the form of CuO in an amount of approximately 10% by mass to 50% by mass, zinc in the form of ZnO in an amount of approximately 30% by mass to 70% by mass, and aluminum in the form of $Al_2O_3$ in an amount of approximately 5% by mass to 20% by mass, relative to the mass of the desulfurizing agent (that is, in terms of the rate of content in the desulfurizing agent) as produced and before use.

ZnO is essential in fixing sulfur in the form of ZnS. An excessively small amount of ZnO will lead to a small desulfurization capacity.

Copper catalyzes the decomposition of an organosulfur compound. In addition to the catalysis, copper also contributes to fixing of sulfur in the form of, for example, $Cu_2S$ or CuS. An excessively small amount of copper will thus lead to a failure to achieve desulfurizing performance.

$Al_2O_3$ contributes to the specific surface area and the strength. An excessively small amount of $Al_2O_3$ will lead to a decrease in the desulfurizing performance, and may also lead to a failure to achieve a practical strength.

The desulfurizing agent contains nickel in the form of Ni in an amount of 1.0% by mass to 10% by mass and rhenium in the form of Re in an amount of 0.1% by mass to 1.0% by mass, relative to the mass of the desulfurizing agent.

The desulfurizing agent preferably contains nickel in the form of Ni in an amount of 3.0% by mass to 10% by mass and rhenium in the form of Re in an amount of 0.1% by mass to 1.0% by mass, relative to the mass of the desulfurizing agent. The desulfurizing agent more preferably contains nickel in the form of Ni in an amount of 3.0% by mass to 6.0% by mass and rhenium in the form of Re in an amount of 0.1% by mass to 1.0% by mass, relative to the mass of the desulfurizing agent.

The desulfurizing agent may contain nickel in the form of Ni in an amount of 1.0% by mass to 6.0% by mass and rhenium in the form of Re in an amount of 0.1% by mass to 1.0% by mass, relative to the mass of the desulfurizing agent. The desulfurizing agent may contain nickel in the form of Ni in an amount of 1.0% by mass to 3.0% by mass and rhenium in the form of Re in an amount of 0.1% by mass to 1.0% by mass, relative to the mass of the desulfurizing agent.

The desulfurizing agent contains nickel and rhenium at a mass ratio Re/Ni of 0.01 to 1, preferably 0.02 to 0.4.

The desulfurizing agent of the present invention may be produced through a process of impregnating a support formed of a copper oxide-zinc oxide-aluminum oxide mixture with a predetermined aqueous solution containing nickel and rhenium dissolved therein, evaporating the aqueous solution to dryness, and firing the resulting product as described above.

The firing operation after the evaporation to dryness may be performed in the air at temperatures ranging from approximately 250° C. to 350° C. for a time period of approximately 1 hour to 10 hours.

Excessively low firing temperatures lead to insufficient decomposition of the nickel or rhenium compound on the support, with the result of a failure to achieve desired performance.

Excessively high firing temperatures lead to the desulfurizing agent having a small specific surface area, again with the result of a failure to achieve desired performance.

Nickel and rhenium may be brought onto the support through a plurality of operations.

Alternatively, nickel and rhenium may be brought onto on the support by a sequential supporting method, in which nickel is first brought onto the support, and then rhenium is brought onto on the support.

[Description of Desulfurizing Method]

A method of the present invention for desulfurizing raw fuel gas G1 (gas) includes subjecting the desulfurizing agent obtained as described above to a reduction treatment in the coexistence of hydrogen and then bringing the resulting product into contact with raw fuel gas G1 (gas) in the coexistence of hydrogen to decompose a sulfur compound in the raw fuel gas G1 and remove it from the raw fuel gas G1.

The present embodiment described here is a case of the desulfurizing method which case includes subjecting the desulfurizing agent obtained (produced) as described above to a reduction treatment in the presence of hydrogen and then bringing the resulting product into contact with raw fuel gas G1 (gas) to decompose a sulfur compound in the raw fuel gas G1 and remove it from the raw fuel gas G1.

The desulfurizing method of the present invention allows for particularly high performance in a case where the raw fuel gas G1 as gas is a gas whose main component is a light hydrocarbon (about C1 to C4) such as natural gas, liquefied petroleum gas, or town gas made of either of the above.

The desulfurizing method of the present invention allows for high desulfurizing performance with respect to an organosulfur compound in the raw fuel gas G1 such as a mercaptan (thiol) or sulfide (thioether), for example, tertiary-butylmercaptan (TBM), tetrahydrothiophene (THT), or dimethyl sulfide (DMS), each commonly used as an odorant.

The raw fuel gas G1 described above with examples may further contain hydrogen sulfide, carbonyl sulfide, and/or a disulfide. This will not cause trouble if the content is small, as the desulfurizing agent of the present invention has an ability to remove such components.

The raw fuel gas G1 described above with examples may further contain a trace amount(s) of hydrogen, carbon monoxide, oxygen, nitrogen, carbon dioxide, and/or water, depending on the production method.

If the raw fuel gas G1 contains, for example, natural gas-based town gas containing biogas, the raw fuel gas G1 may also contain hydrogen, carbon monoxide, oxygen, nitrogen, and carbon dioxide in respective (volume-based) amounts of approximately 4%, 0.05%, 0.01%, 1.0%, and 0.5% at the maximum.

Among the above components, carbon monoxide and carbon dioxide may react with hydrogen on the desulfurizing agent and produce methane through methanation reaction, and are thus normally not preferable if present at high concentrations. The desulfurizing agent of the present invention, however, has relatively low methanation activity as compared to a desulfurizing agent whose main component is Ni or a desulfurizing agent containing Ru. Methanation activity thus has only a little influence.

The raw fuel gas G1 should better not contain oxygen, which may oxidize the desulfurizing agent and decrease the desulfurizing performance. However, if the content is approximately 0.1%, oxygen will not cause trouble, as it will react with hydrogen on the desulfurizing agent and be removed rapidly, and the reaction will cause only a small temperature increase.

Liquefied petroleum gas may contain a small amount(s) of not only a saturated hydrocarbon such as propane and butane, but also an unsaturated hydrocarbon such as propylene and butadiene. Natural gas-based town gas, which normally contains a small amount of liquefied petroleum gas added thereto for adjustment of the amount of heat, may similarly contain a small amount of unsaturated hydrocarbon. Unsaturated hydrocarbon is converted to saturated hydrocarbon on the desulfurizing agent in the coexistence of hydrogen, but may cause carbon to be deposited on the desulfurizing agent through a polymerization reaction. The desulfurizing agent of the present invention, however, has relatively low carbon depositing activity as compared to a desulfurizing agent containing Ru. Unsaturated hydrocarbon thus has only a little influence.

The desulfurizing agent (as produced) is reduced through a reduction treatment in the presence of hydrogen before being brought into contact with raw fuel gas G1.

The reduction treatment is performed at temperatures ranging from approximately 150° C. to 350° C.

The reduction treatment involves use of gas containing an inert gas such as nitrogen and hydrogen (hydrogen gas) added thereto in an amount of approximately 1% by volume to 10% by volume.

The reduction treatment is performed for a time length that is necessary for stoichiometric reduction and that is calculated from the flow rate of gas for use in the reduction treatment and the hydrogen content. The actual time length should, however, be better approximately 1.5 to 3 times larger than the time length calculated as necessary.

Excessively low reduction temperatures will lead to a failure to complete reduction. Excessively high reduction temperatures will lead to the desulfurizing agent being sintered and having decreased performance.

If the gas for use in the reduction treatment has an excessively low hydrogen concentration (hydrogen gas volume concentration), the reduction treatment will uneconomically require a large amount of the gas to complete reduction. If the gas for use in the reduction treatment has an excessively high hydrogen concentration, the hydrogen will react with the oxidized desulfurizing agent with heat of reaction that will unsuitably cause a sharp temperature rise. A sharp temperature rise may, for instance, lead to a failure to keep the reduction temperature within an intended range.

The desulfurizing method of the present invention includes filling a desulfurizing agent container with the desulfurizing agent, keeping the temperature of the desulfurizing agent within a predetermined range through, for example, external heating, and introducing raw fuel gas G1 containing hydrogen added thereto into the desulfurizing agent container.

Desulfurization reaction does not generate or absorb a large amount of heat unless the sulfur compound has an extremely high concentration. The desulfurizing method may thus include preheating raw fuel gas G1 or raw fuel gas G1 containing hydrogen gas added thereto to a temperature preferable for desulfurization and causing the raw fuel gas G1 to react in a thermally insulated (unheated or uncooled) desulfurizing agent container. The desulfurizing method may include, for instance, preheating raw fuel gas G1 or raw fuel gas G1 containing hydrogen gas added thereto to a temperature of approximately 150° C. to 350° C., which is the range of temperatures for the reduction treatment.

Hydrogen may be added in an amount that is determined in accordance with the type and amount of the sulfur compound in the raw material. Since the raw fuel gas G1 normally contains sulfur in a ppm-level amount, hydrogen is added at a molar rate of approximately not less than 0.001, preferably 0.01 to 0.5, more preferably 0.01 to 0.2, relative to the raw fuel gas G1.

If the desulfurization serves as a pretreatment of a steam-reforming process, the desulfurizing method may include recycling part of the hydrogen generated through the steam-reforming reaction.

Steam-reforming reaction may generate hydrogen accompanied by carbon monoxide, carbon dioxide, and/or steam. However, those elements will cause no major trouble unless they are present at molar rates exceeding approximately 0.01, relative to the raw fuel gas G1.

[Description of Desulfurizing System]

FIG. 1 is a diagram schematically illustrating an example flow for a desulfurizing system for performing desulfurization as a pretreatment of a steam-reforming process.

FIG. 1 illustrates a desulfurizing system 100 including a desulfurizer 1 sealed with a desulfurizing agent therein and a reformer 2 sealed with a reforming catalyst therein. The desulfurizing system 100 is a reaction system for desulfurizing raw fuel gas G1 supplied thereto and then steam-reforming the resulting gas to produce reformed fuel gas G3 containing hydrogen.

The description below specifically deals with the desulfurizing system 100.

The desulfurizing system 100 receives raw fuel gas G1, which is supplied through a supply path 11 into the desulfurizer 1 and exits the desulfurizer 1 as desulfurizing agent outlet gas G2.

The desulfurizing agent outlet gas G2 is supplied from the desulfurizer 1 through a reformer flow path 12 into the reformer 2, which is connected to the downstream side of the reformer flow path 12. The reformer flow path 12 is connected to a steam supply path 21, and receives steam S serving as water. The reformer 2 thus receives desulfurizing agent outlet gas G2 and steam S.

The reformer 2 reforms the desulfurizing agent outlet gas G2 into reformed fuel gas G3. The reformed fuel gas G3 is supplied through a reformed gas flow path 13, connected to the downstream side of the reformer 2, to a fuel cell (not shown in the drawings), for example, for a subsequent step.

A portion of the reformed fuel gas G3 is returned through a return path 31, branching out from the reformed gas flow path 13 and connected to the supply path 11, to the desulfurizer 1 as recycled gas G4.

[Description of Examples]

The description below deals with the present invention in greater detail on the basis of Examples.

The present invention is, however, not limited to the Examples.

Example 1

Onto 70.03 g of a commercially available copper oxide-zinc oxide-aluminum oxide mixture molded product (available from Sud-Chemie Catalysts Japan, Inc., MDC-7, 3-mm tablet, CuO: 41% by mass, ZnO: 46% by mass, $Al_2O_3$: 9% by mass) as a support, 50 g of an aqueous solution containing ammonium perrhenate (containing 0.352 g of Re) and nickel nitrate (containing 4.470 g of Ni) dissolved therein was dropped for impregnation for 3 hours.

After that, the aqueous solution was evaporated to dryness on a hot plate as a heater. The resulting product was then dried overnight in a drier set at 110° C. Subsequently, the product was placed in a muffle furnace as a firing furnace, and the muffle furnace was heated at a rate of 2° C. per minute up to 300° C. so that the product was heated in the air. The muffle furnace was then kept at 300° C. for 1 hour for a firing operation. This produced a desulfurizing agent A containing Re in an amount of 0.5% by mass and Ni in an amount of 6% by mass.

A reaction tube made of heat-resistant glass (Pyrex glass) with an inner diameter of 14 mm was filled with 20 g of the desulfurizing agent A for formation of a desulfurizing agent layer. This desulfurizing agent layer would serve as the desulfurizer 1.

While the reaction tube was heated to keep a lower end portion (on the exit side) of the desulfurizing agent layer at 250° C., reduction gas containing nitrogen gas mixed with 2% of hydrogen gas (volume-based) was flown through the desulfurizing agent layer at a rate of 60 liters per hour (in terms of volume under standard conditions [at 0° C. and 1 atmospheric pressure]) for a reduction treatment for 4 hours. In other words, the desulfurizing agent A was reduced in the presence of hydrogen.

After the reduction treatment, the heating condition was changed. While the reaction tube was heated to keep the lower end portion of the desulfurizing agent layer at 200° C., nitrogen gas mixed with 130 ppm of DMS and 2% of hydrogen (each volume-based) was flown the desulfurizing agent layer at a rate of 20 liters per hour (in terms of volume under standard conditions [at 0° C. and 1 atmospheric pressure]). In other words, the desulfurizing agent A was brought into contact with raw fuel gas G1 in the coexistence of hydrogen. The raw fuel gas G1 contained nitrogen as a component in place of a hydrocarbon such as methane for a simpler experiment. In other words, the experiment used, as raw fuel gas G1, model gas of a reductive atmosphere including nitrogen (that is, a substitute gas for a hydrocarbon) and a predetermined amount of DMS as a sulfur compound (odorant) added thereto.

The respective concentrations of DMS, hydrogen sulfide, and methane in the desulfurizing agent outlet gas G2 were analyzed with use of a gas chromatograph (available from Shimadzu Corporation, GC-14B, equipped with a FPD and FID).

In the desulfurizing agent outlet gas G2, DMS was initially not detected, and was detected to have a concentration of 3.4 ppb after 72 hours, 4.6 ppb after 74 hours, and 5.2 ppb after 75 hours.

Assuming the lifetime to be a time period up to a time point at which the concentration of the DMS in the desulfurizing agent outlet gas G2 exceeds 5 ppb (5-ppb breakthrough time), the lifetime was 74.7 hours.

No hydrogen sulfide was detected in the desulfurizing agent outlet gas G2 until 75 hours passed. The concentration of methane was substantially constant at approximately 300 ppm. The DMS was presumed to have been decomposed into hydrogen sulfide and methane. The hydrogen sulfide was presumed to have been absorbed by the desulfurizing agent.

Example 2

Operations similar to those of Example 1 were performed except that the ammonium perrhenate contained Re in an amount of 0.140 g. This produced a desulfurizing agent B containing Re in an amount of 0.2% by mass and Ni in an amount of 6% by mass.

The desulfurizing performance was determined similarly to Example 1. The 5-ppb breakthrough time was 71.7 hours.

Example 3

Operations similar to those of Example 1 were performed except that the nickel nitrate contained Ni in an amount of 2.166 g and that the ammonium perrhenate contained Re in an amount of 0.351 g. This produced a desulfurizing agent C containing Re in an amount of 0.5% by mass and Ni in an amount of 3% by mass.

The desulfurizing performance was determined similarly to Example 1. The 5-ppb breakthrough time was 42.0 hours.

Comparative Example 1

The copper oxide-zinc oxide-aluminum oxide mixture molded product used in Example 1 was itself used as a desulfurizing agent (desulfurizing agent D).

The desulfurizing performance was determined similarly to Example 1. The 5-ppb breakthrough time was 20.0 hours.

Comparative Example 2

Operations similar to those of Example 1 were performed except that No Re was used. This produced a desulfurizing agent E containing Ni in an amount of 6% by mass.

The desulfurizing performance was determined similarly to Example 1. The 5-ppb breakthrough time was 41.9 hours.

Comparative Example 3

Operations similar to those of Example 3 were performed except that No Re was used. This produced a desulfurizing agent F containing Ni in an amount of 3% by mass.

The desulfurizing performance was determined similarly to Example 1. The 5-ppb breakthrough time was 26.6 hours.

Comparative Example 4

Operations similar to those of Example 1 were performed except that No Ni was used. This produced a desulfurizing agent G containing Re in an amount of 0.5% by mass.

The desulfurizing performance was determined similarly to Example 1. The 5-ppb breakthrough time was 17.8 hours.

Table 1 shows the results of Examples 1 to 3 and Comparative Examples 1 to 4.

The desulfurizing agent A, which contained Re in an amount of 0.5% by mass and Ni in an amount of 6% by mass, had a 5-ppb breakthrough time of 74.7 hours. The desulfurizing agent B, which contained Re in an amount of 0.2% by mass and Ni in an amount of 6% by mass, had a 5-ppb breakthrough time of 71.7 hours. These breakthrough times are remarkably longer than 20.0 hours as the 5-ppb breakthrough time of the desulfurizing agent D (copper oxide-zinc oxide-aluminum oxide mixture molded product).

The desulfurizing agent C, which contained Re in an amount of 0.5% by mass and Ni in an amount of 3% by mass, had a 5-ppb breakthrough time of 42.0 hours. This is also remarkably longer than the 5-ppb breakthrough time of the desulfurizing agent D.

Containing only Re or only Ni produces a limited effect of extending the 5-ppb breakthrough time as indicated by the results for the desulfurizing agents E and G. The results for the desulfurizing agents A to G clearly indicate that a desulfurizing agent containing both Re and Ni in accordance with the present invention has greatly improved desulfurizing performance.

In other words, each of the desulfurizing agents A to C, even at a low temperature of approximately 200° C., achieved high desulfurizing performance with respect to sulfur compounds such as DMS and hydrogen sulfide and thereby allowed the respective concentrations of sulfur compounds slipping (that is, leaking) to a later stage (that is, the downstream side of the desulfurizer 1) to be kept at particularly low levels for an extended time period, and also had a high desulfurization capacity and thereby treated (that is, desulfurized) raw fuel gas G1 for an extended period of time with a small amount used.

TABLE 1

|  |  |  | 5-ppb breakthrough time (hours) |
|---|---|---|---|
| Example 1 | Desulfurizing agent A | 0.5 mass % Re-6 mas s% Ni | 74.7 |
| Example 2 | Desulfurizing agent B | 0.2 mass % Re-6 mass % Ni | 71.7 |
| Example 3 | Desulfurizing agent C | 0.5 mass % Re-3 mass % Ni | 42.0 |
| Comparative Example 1 | Desulfurizing agent D | None | 20.0 |
| Comparative Example 2 | Desulfurizing agent E | 6 mass % Ni | 41.9 |
| Comparative Example 3 | Desulfurizing agent F | 3 mass % Ni | 26.6 |
| Comparative Example 4 | Desulfurizing agent G | 0.5 mass % Re | 17.8 |

Example 4

[Test of Desulfurizing Town Gas]

Operations similar to those of Example 1 were performed except that the support was 200.08 g of a copper oxide-zinc oxide-aluminum oxide mixture molded product and that the aqueous solution contained ammonium perrhenate (containing 1.01 g of Re) and nickel nitrate (containing 12.77 g of Ni) dissolved therein. This produced a desulfurizing agent H containing Re in an amount of 0.5% by mass and Ni in an amount of 6% by mass.

A reaction tube made of stainless steel with an inner diameter of 26 mm was filled with 66 cc (97.4 g) of the desulfurizing agent H. The stainless-steel reaction tube filled with the desulfurizing agent H would serve as the desulfurizer 1.

The whole reaction tube was placed in a constant-temperature device kept at 250° C. Then, reduction gas containing nitrogen gas mixed with 2% of hydrogen (volume-based) was flown through the reaction tube at a rate of 300 liters per hour (in terms of volume under standard conditions [at 0° C. and 1 atmospheric pressure]) for a reduction treatment for 5 hours.

After the reduction treatment, the temperature of the constant-temperature device was lowered to 200° C. Then, 13 A town gas mixed with 2% of hydrogen (volume-based) was flown through the reaction tube as raw fuel gas G1 at a rate of 330 liters per hour (in terms of volume under standard conditions [at 0° C. and 1 atmospheric pressure]). The 13 A town gas as raw fuel gas G1 contains DMS in an amount of approximately 3.1 ppm and TBM in an amount of approximately 2.4 ppm as odorants (sulfur compounds).

The respective concentrations of DMS, TBM, and hydrogen sulfide in the desulfurizing agent outlet gas G2 were analyzed with use of a gas chromatograph (GC-14B, equipped with a FPD).

None of DMS, TBM, and hydrogen sulfide was detected in the desulfurizing agent outlet gas G2 even after 300 hours.

Comparative Example 5

Operations similar to those of Example 4 were performed except that No Re was used. This produced a desulfurizing agent I containing Ni in an amount of 6% by mass. The desulfurizing performance was determined similarly to Example 4. In the desulfurizing agent outlet gas G2, DMS was initially not detected, and was detected to have a concentration of 5.4 ppb after 228.3 hours and 5.6 ppb after 237.7 hours.

Table 2 shows the results of Example 4 and Comparative Example 5.

The desulfurizing agent I, which contained only Ni in an amount of 6% by mass, had a DMS breakthrough time of 228.3 hours, whereas with the desulfurizing agent H, which contained Re in an amount of 0.5% by mass and Ni in an amount of 6% by mass, none of DMS, TBM, and hydrogen sulfide was detected even after 300 hours. This clearly shows that a desulfurizing agent containing both Re and Ni achieves high performance also in desulfurizing gas whose main component is a hydrocarbon.

In other words, the desulfurizing agent H, even at a low temperature of approximately 200° C., achieved high desulfurizing performance with respect to sulfur compounds such as DMS, TBM, and hydrogen sulfide and thereby allowed the respective concentrations of sulfur compounds slipping to a later stage to be kept at particularly low levels for an extended time period, and also had a high desulfurization capacity and thereby treated (that is, desulfurized) raw fuel gas G1 for an extended period of time with a small amount used.

TABLE 2

|  |  |  | Breakthrough time (hours) |
|---|---|---|---|
| Example 4 | Desulfurizing agent H | 0.5 mass % Re-6 mass% Ni | Undetected for 300 hours |
| Comparative Example 5 | Desulfurizing agent I | 6 mass % Ni | 228.3 |

Alternative Embodiments (1) The embodiment described above is an example case of a desulfurizing system 100 including a desulfurizer 1 upstream of a reformer 2 (that is, a reformer 2 downstream of a desulfurizer 1).

The desulfurizing system 100, however, does not necessarily include a reformer 2, and may instead include a processing device such as a reactor other than a reformer.

(2) The embodiment described above is based on an example case of the gas being a gas whose main component is nitrogen and an example case of the gas being raw fuel gas G1. The desulfurizing agent and desulfurizing method of the present invention, however, each achieve its desulfurizing performance even with respect to gas containing a different component(s) as long as the gas contains hydrogen and can be brought into contact with the desulfurizing agent in a reductive atmosphere.

(3) The embodiment described above is an example desulfurizing method in which the desulfurizing agent as produced contains copper in the form of copper oxide, and the desulfurizing agent as produced is subjected to a reduction treatment before use for desulfurization reaction. If, however, the desulfurizing agent as produced contains copper in the form of metal copper, the desulfurizing method does not necessarily include a reduction treatment.

Similarly, the embodiment described above is an example desulfurizing method in which the desulfurizing agent as produced contains a nickel component in the form of an oxide, and the desulfurizing agent as produced is subjected to a reduction treatment before use for desulfurization reaction. If, however, the desulfurizing agent as produced contains a nickel component mainly in the form of metal nickel, the desulfurizing method does not necessarily include a reduction treatment.

Further, the embodiment described above is an example desulfurizing method in which the desulfurizing agent as produced contains a rhenium component in the form of an oxide, and the desulfurizing agent as produced is subjected to a reduction treatment before use for desulfurization reaction. If, however, the desulfurizing agent as produced contains a rhenium component mainly in the form of metal rhenium, the desulfurizing method does not necessarily include a reduction treatment.

The arrangements of each of the embodiments described above (including the alternative embodiments) may be used in combination with an arrangement(s) disclosed for a different embodiment unless such combination causes any contradiction. The embodiments disclosed herein (including the alternative embodiments) are merely examples. The present invention is not limited to such embodiments, and may be varied as appropriate as long as such variation does not prevent an object of the present invention from being attained.

INDUSTRIAL APPLICABILITY

The present invention is applicable to, for example, a desulfurizing agent and desulfurizing method for a raw fuel gas intended to be supplied to a reformer of fuel gas for a fuel cell.

REFERENCE SIGNS LIST

1 Desulfurizer
2 Reformer
11 Supply path
12 Reformer flow path
13 Reformed gas flow path
21 Steam supply path
31 Return path
G1 Raw fuel gas
G2 Desulfurizing agent outlet gas
G3 Reformed fuel gas
G4 Recycled gas
S Steam
100 Desulfurizing system

The invention claimed is:

1. A gas desulfurizing agent, comprising:
zinc oxide;
aluminum oxide; and
copper,
the gas desulfurizing agent further comprising:
nickel in an amount of 1.0% by mass to 10% by mass; and
rhenium in an amount of 0.1% by mass to 1.0% by mass.

2. A gas desulfurizing method, comprising:
bringing a desulfurizing agent into contact with gas in coexistence of hydrogen to decompose a sulfur compound in the gas and remove the sulfur compound from the gas,
the desulfurizing agent comprising:
zinc oxide,
aluminum oxide, and
copper,
the desulfurizing agent further comprising:
nickel in an amount of 1.0% by mass to 10% by mass; and
rhenium in an amount of 0.1% by mass to 1.0% by mass.

\* \* \* \* \*